United States Patent [19]

Haddad, Jr.

[11] Patent Number: 5,573,295
[45] Date of Patent: Nov. 12, 1996

[54] DOUBLE PIVOT ARM COVER SYSTEM

[75] Inventor: Edward N. Haddad, Jr., Worcester, Mass.

[73] Assignee: Pioneer Consolidated Corporation, North Oxford, Mass.

[21] Appl. No.: 385,777

[22] Filed: Feb. 9, 1995

[51] Int. Cl.⁶ ........................................................ B60P 7/02
[52] U.S. Cl. .............................................. 296/100; 296/98
[58] Field of Search ................................ 296/100, 98, 117

[56] References Cited

U.S. PATENT DOCUMENTS

| | | |
|---|---|---|
| 3,041,104 | 6/1962 | Richard . |
| 3,416,834 | 12/1968 | Morse, Jr. . |
| 3,549,199 | 12/1970 | Sibley . |
| 3,628,826 | 12/1971 | Sibley ........................... 296/98 |
| 3,833,255 | 9/1974 | Logue ......................... 296/137 B |
| 3,841,697 | 10/1974 | McFarland .................... 296/100 |
| 3,975,047 | 8/1976 | McClellan ..................... 296/100 |
| 4,023,857 | 4/1977 | Killion ........................... 296/98 |
| 4,030,780 | 6/1977 | Petretti ......................... 296/100 |
| 4,050,734 | 9/1977 | Richard ........................... 296/98 |
| 4,095,840 | 6/1978 | Woodard ...................... 296/100 |
| 4,341,416 | 7/1982 | Richard ........................... 296/98 |
| 4,516,802 | 5/1985 | Compton ......................... 296/98 |
| 4,627,658 | 12/1986 | Vold et al. .................... 296/100 |
| 4,740,029 | 4/1988 | Tuerk ........................... 296/100 |
| 4,874,196 | 10/1989 | Goldstein et al. ................ 296/98 |
| 5,238,287 | 8/1993 | Haddad, Jr. ..................... 296/98 |

FOREIGN PATENT DOCUMENTS

| | | | |
|---|---|---|---|
| 1146768 | 4/1963 | Germany .................. 296/100 |
| 3139303 | 8/1982 | Germany .................. 296/100 |
| 1733288 | 5/1992 | U.S.S.R. ................... 296/100 |

OTHER PUBLICATIONS

"Tarper" C-Wil-Meyer Fabricating, Inc. Rt. 3 Box 34B, Seymour, WI 54165.

Primary Examiner—Joseph D. Pape
Attorney, Agent, or Firm—Weingarten, Schurgin, Gagnebin & Hayes LLP

[57] ABSTRACT

A cover mechanism is provided that includes a first assembly having: a first flexible cover, a first pivot arm unit engagable with a trailer or other open container, and a first roller; and a second assembly having a second flexible cover, a second pivot arm unit securable to said trailer between the first assembly and a second end of the trailer, and a second roller. The first pivot arm unit is operative to pull the first flexible cover over the trailer from one end of the trailer toward a central portion of the trailer and the second pivot arm unit is operative to pull the second flexible cover over the trailer from the opposite end of the trailer toward a central portion of the trailer.

12 Claims, 4 Drawing Sheets

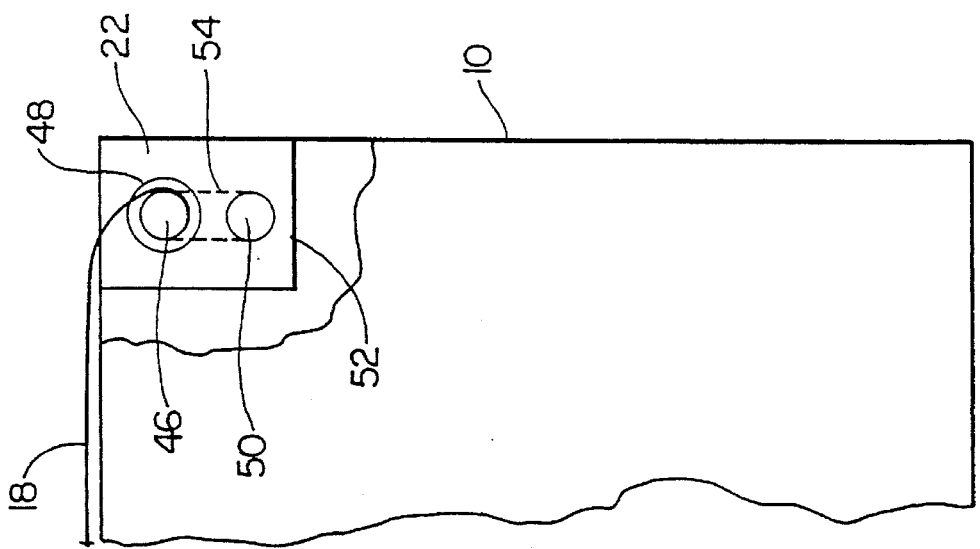
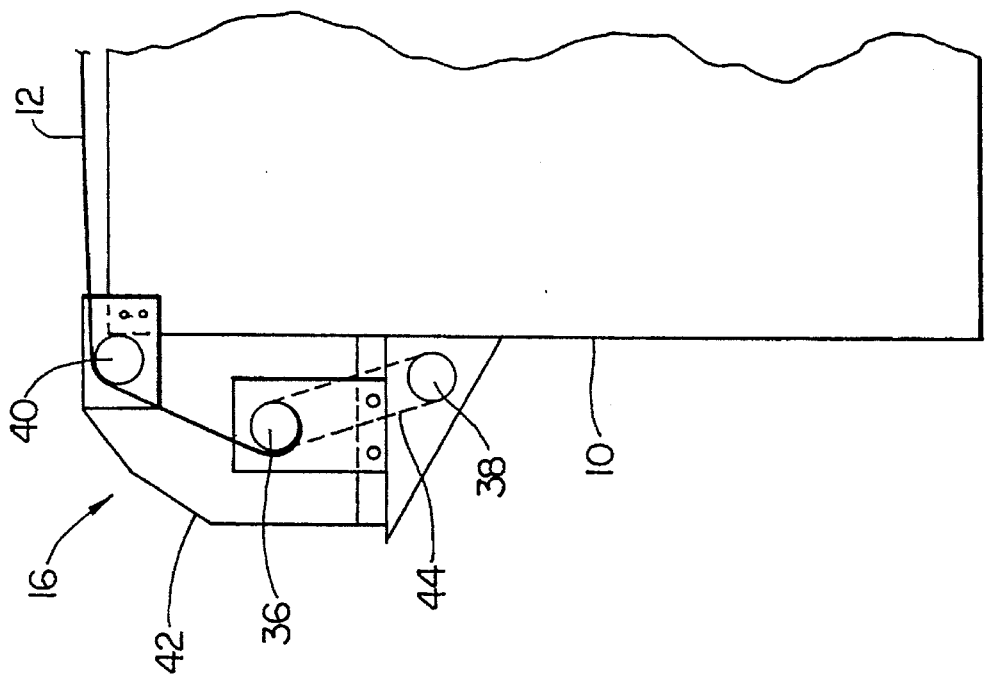

DOUBLE PIVOT ARM COVER SYSTEM

FIELD OF THE INVENTION

The invention relates to truck covers and more particularly to a double pivot arm cover mechanism.

BACKGROUND OF THE INVENTION

A pliable cover for an upwardly open truck body, cargo container, or trailer serves both to protect a load within the body, container, or trailer and to minimize the likelihood of all or part of the load from escaping therefrom. Because covers of this type are often large and unwieldy, some form of mechanical assistance is required to spread and secure the cover. Truck cover manipulators provide this assistance.

Spreading a cover across a trailer or container over 30 feet in length presents particular challenges. One approach to covering very long trailers is a cable or track type system, wherein a cover is pulled horizontally over the trailer. Cable or track systems generally include movable elements attached to a cover and which are engaged with tracks or guides associated with the sides of the trailer. Deformation of the sides of a trailer, however, can displace the tracks of a cable or track type system, thereby causing the movable elements to bind and thus preclude normal extension and retraction of the cover. Trailers used for transporting rubbish, for example, are generally 40 to 50 feet long and develop outwardly deformed or bowed sides.

Another drawback of cable or track type systems is that in order to extend and retract the cover, the load cannot be heaped up above the plane of movement of the cover during deployment. This requires that the trailer be either underfilled or that the contents be carefully leveled after loading. If it were not for this limitation, certain materials (depending on the particular characteristics of the material to be transported) could be heaped up significantly without exceeding the weight limitation of a given trailer.

Another approach to covering an upwardly open container is represented by pivot arm systems, wherein two parallel arms are pivotally engaged on opposite sides of a trailer and move in unison to draw a cover from one end of the trailer to the other. However, if a system having non-telescoping arms is used in association with a long trailer, the arms have such a length that the cover is raised into the air like a sail during deployment and retraction. If even the slightest breeze is present, the arms and cover can be subjected to a load so high that the system ceases to function or is damaged. Additionally, the great length of the arms requires significant overhead clearance. Particular care is required when operating in the vicinity of power lines, as contact between the lines and the arms could prove fatal to the system operator.

SUMMARY OF THE INVENTION

The present invention overcomes the foregoing disadvantages by providing a double pivot arm cover mechanism. The cover mechanism allows a flexible cover to be lofted over heaped loads without exposing a potentially dangerous amount of the cover to the wind or requiring an exceptional amount of overhead clearance. The cover mechanism also provides for deployment and retraction of the cover irrespective of some types of damage, such as bowing, to the sides of a trailer. Also, the cover mechanism provides virtually unimpeded access to the interior of a trailer or other open container when the cover is in a retracted state.

In an exemplary embodiment, the cover mechanism includes a first assembly having: a first flexible cover, a first pivot arm unit engaged with a trailer, and a first roller proximate one end of a trailer; and a second assembly having a second flexible cover, a second pivot arm unit secured to said trailer between the first assembly and a second end of the trailer, and a second roller proximate the second end of the trailer. The first pivot arm unit is operative to pull one end of the first flexible cover from one end of the trailer toward a central portion of the trailer and the second pivot arm unit is operative to pull one end of the second flexible cover from the opposite end of the trailer toward a central portion of the trailer.

The cover mechanism can further include an idler roller proximate one or both ends of the trailer to guide the respective covers toward associated winding mechanisms. A locking mechanism, such as a ratchet and strap, secured to the trailer and securable to at least one of the pivot arm units, can be provided to inhibit movement of the arm unit with respect to the trailer. The arm units can be configured so that when both covers have been pulled toward the center of the trailer, the covers overlap.

In another embodiment, two hydraulically powered arm units each include a spring loaded roller and a flexible cover. As the rollers are conveyed fore and aft over the trailer body, the covers are dispensed or retracted to cover or uncover a load within the trailer body.

BRIEF DESCRIPTION OF THE DRAWINGS

These and further features of the invention may be better understood with reference to the accompanying specification and the drawings in which:

FIG. 2 is a side view of a first roller assembly of the cover mechanism of FIG. 1, positioned proximate one end of the trailer;

FIG. 3 is a side view of a second roller assembly of the cover mechanism of FIG. 1, positioned proximate a second end of the trailer;

DETAILED DESCRIPTION OF THE INVENTION

Figure 1:
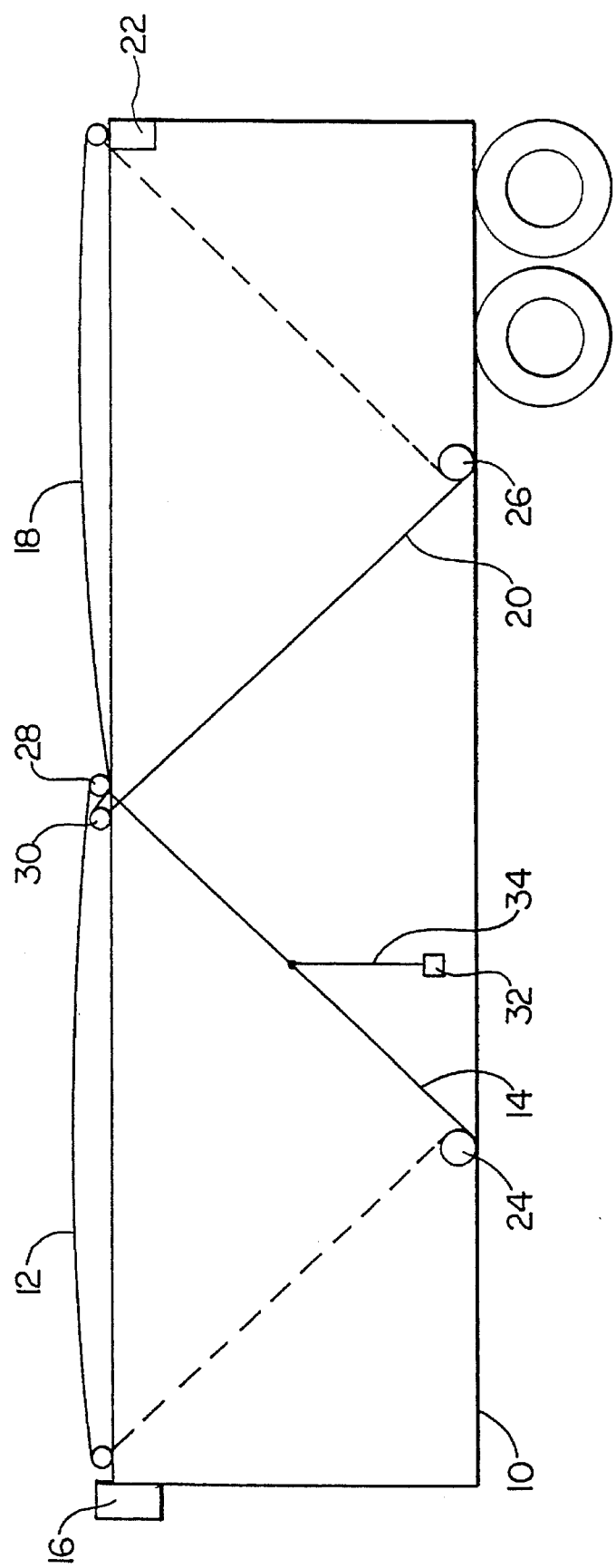
FIG. 1 is a side view of a trailer provided with a double pivot arm cover mechanism.

FIG. 1 is a side view of trailer 10 illustrating an embodiment of a double pivot arm cover mechanism, hereinafter referred to as "the cover mechanism." It should be noted that "trailer," as used herein, is meant to encompass any upwardly open receptacle, such as a compartment integral to a vehicle, a detachable trailer unit, or a container positionable on a trailer, and the like.

In this embodiment, the cover mechanism includes a first assembly, having a first flexible cover 12, a first pivot arm unit 14, and a cover take-up or winding device, hereinafter referred to as "the first roller assembly" 16; and a second assembly, having a second flexible cover 18, a second pivot arm unit 20, and a second cover take-up or winding device, hereinafter referred to as "the second roller assembly" 22. The covers 12 and 18 are shown in a deployed state, covering a heaped load in a trailer 10 at least 30 to 50 feet in length. However, were the load not to project above the uppermost edge of the trailer 10, the covers 12 and 18 would appear flat or downwardly sagging. It should be noted that "cover," as used herein, is meant to encompass any material (perforate or imperforate) sufficiently flexible to be rolled, such as a plastic or fabric tarp, net, or web.

Each pivot arm unit 14 and 20 comprises first and second substantially parallel arms pivotally engaged with the trailer 10 at attachment points 24 and 26, respectively. Although in the illustration the arms and attachment points are only shown for one side of the trailer 10, it should be understood that the opposite side of the trailer is a mirror image of the illustrated side.

Each pivot arm unit 14 and 20 is powered or positioned by springs, hydraulics, or pneumatics, using devices known to those skilled in the art. Activation of the power or positioning mechanism is initiated and controlled by means of an operator interface device (not shown) as is known by those skilled in the art. Thus, upon receipt of the appropriate operator input, the pivot arm units 14 and 20 pivot, either sequentially or in unison, toward or away from their associated rollers 16 and 22 to assist in deploying or stowing the covers 12 and 18 which are secured to the upper or free ends of the arms.

A connecting element such as a bar 28 and 30 can be included in one or both of the pivot arm units, wherein the bar extends laterally across the trailer 10 to connect an upper portion of one arm of a pivot arm unit to an upper portion of the other arm of the pivot arm unit. The connecting element provides additional strength and stability to the arms, permits a positioning device to be coupled to only one arm of a pivot arm unit, and provides additional points for connection of one end of the cover to the pivot arm unit.

A locking device is securable to one or both arms of one or both of the pivot arm units 14 and 20 to inhibit movement of the arms. In an exemplary embodiment, the locking device includes a ratchet mechanism 32, secured to the trailer 10, for adjusting tension applied to a strap 34, engagable with an arm of pivot arm unit 14, for example.

FIG. 2 is a side view of the first roller assembly 16 of the cover mechanism of FIG. 1, positioned proximate one end of the trailer 10. The first roller assembly, for dispensing, retracting, storing, and protecting the first cover 12, includes a roller 36 engaged with a drive mechanism 38, an idler roller 40, and a protective housing 42. The idler roller 40 is positioned to smoothly guide the first cover 12 to and from the roller 36 and to establish an initial clearance between the top of the trailer 10 and the first cover 12. The drive mechanism 38 can include a bi-directional, electric or hydraulic motor, a torque limiting clutch, and a belt or chain drive 44. In another embodiment, the drive mechanism includes a hand crank with a chain drive.

FIG. 3 is a side view of the second roller assembly 22 of the cover mechanism of FIG. 1, positioned proximate the end of the trailer 10 opposite the first roller assembly 16. The second roller assembly 22, for dispensing, retracting, storing, and protecting the second cover 18, includes a roller 46 seated in a pair of opposing bearings 48 and engaged with a drive mechanism 50, and a protective housing 52. The roller 46 can be positioned to establish an initial clearance between the top of the trailer 10 and the second cover 18. The drive mechanism 50 can include a bi-directional, electric or hydraulic motor, a torque limiting clutch, and a belt or chain drive 54. In another embodiment, the drive mechanism includes a hand crank with a chain drive. A idler roller assembly (not shown) can be provided to guide the cover if required.

Activation of the cover mechanism by an operator causes the pivot arm units 14 and 20 to operate in a coordinated manner with the first and second roller assemblies 16 and 22, respectively, to deploy or retract the covers. In the retracted state, the arms are pivoted toward their respective ends of the trailer 10, whereas in the deployed state, the arms are pivoted toward the center of the trailer.

Figure 4:
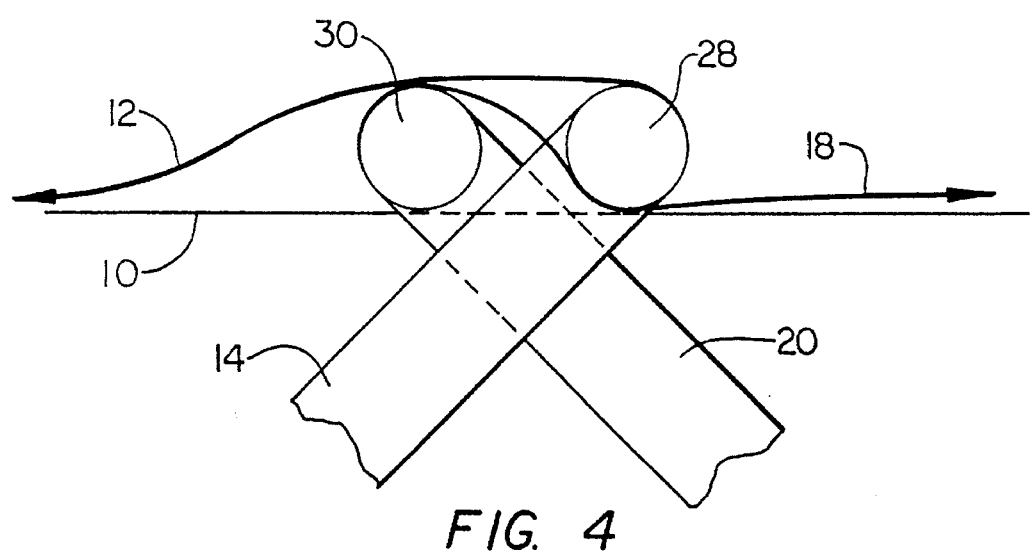
FIG. 4 is a side view of a portion of the cover mechanism illustrated in FIG. 1, wherein a first and a second cover are illustrated in an overlapping relationship.

FIG. 4 is a side view of a portion of the arms illustrated in FIG. 1, wherein the cover mechanism is in the deployed state. It should be noted that the cover mechanism can be operated such that the arms of each of the pivot arm units 14 and 20 overlap, so that the bar 30 is covered by the first cover 12 and bar 28 rests on top of the second cover 18 to ensure that the leading edge of the second cover 18, with respect to an air stream, is shielded from the air stream. One configuration for enabling the arms to overlap, requires that the arms of one of the pivot arm units be spaced farther apart than the arms of the second pivot arm unit.

Figure 5:
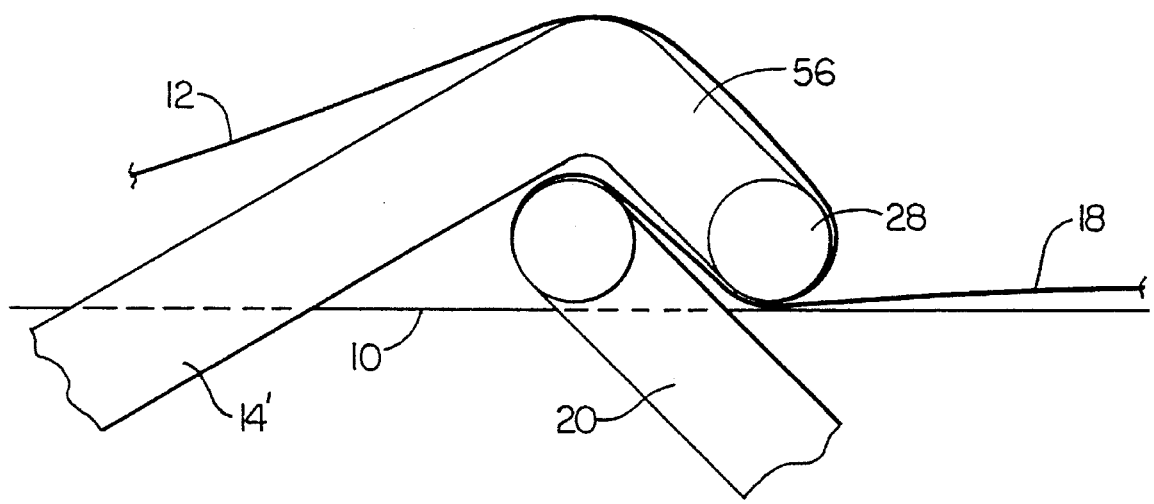
FIG. 5 is a side view of a portion of the cover mechanism illustrated in FIG. 1, which illustrates an alternative embodiment of the arms.

For applications that do not permit one set of arms to be spaced farther apart than the arm of the other set, a different configuration as illustrated in FIG. 5 is provided that allows the sets of arms to have equidistant spacing while ensuring that the forward cover 12 overlaps the rearward cover 18. In this embodiment a pivot arm unit 14' is illustrated having an angled distal end portion 56. The length of the end portion 56 and the angle of bend can be altered as required.

Figure 6:
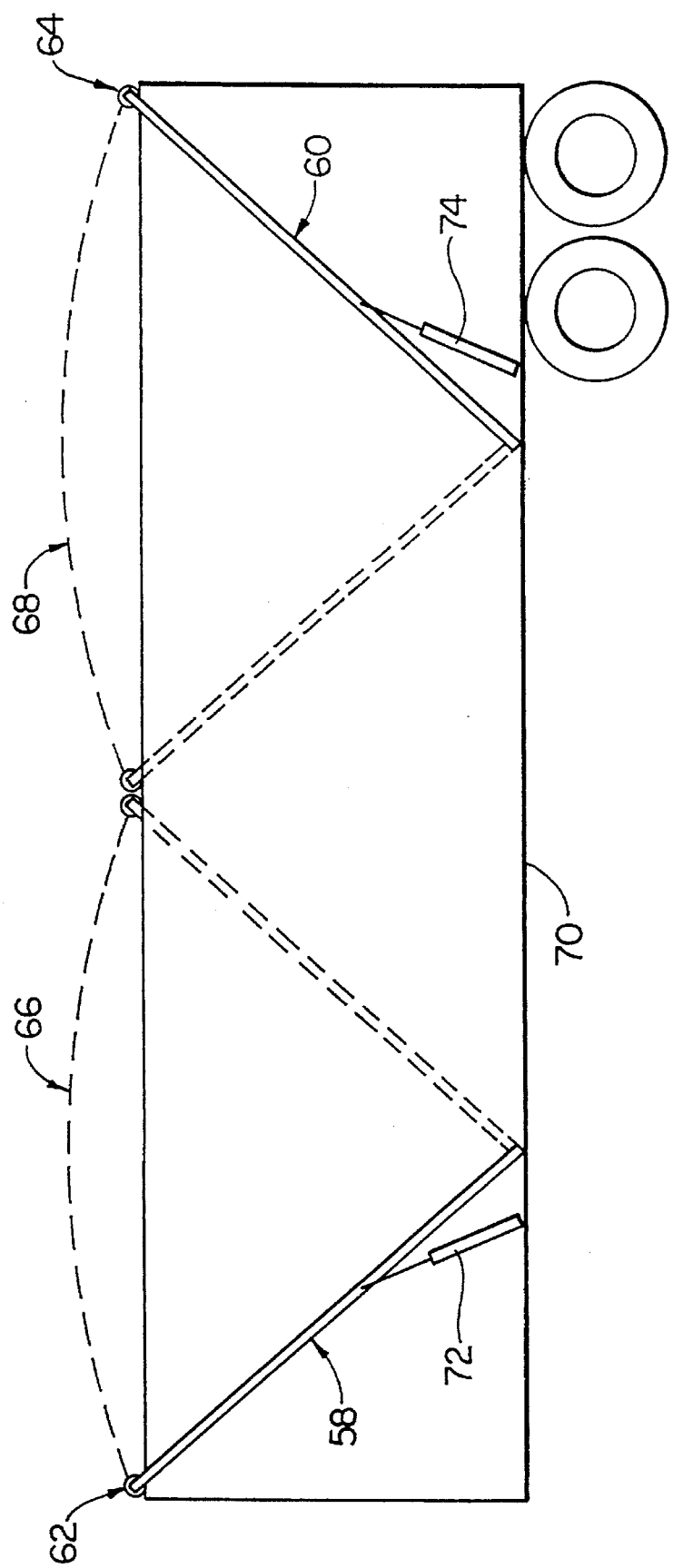
FIG. 6 is a side view of trailer provided with another embodiment of the double pivot arm cover mechanism.

FIG. 6 illustrates another embodiment of the double pivot arm cover system, wherein a first pivot arm unit 58 and a second pivot arm unit 60 include spring loaded rollers 62 and 64, respectively. The rollers 62 and 64 dispense and retract flexible covers 66 and 68, respectively, as the arms units are moved. One end of each of the covers is attached to an end portion of the trailer body 70 to anchor them while they are unrolled.

In this illustrated embodiment, a load in the trailer body 70 is covered when the arm units 58 and 60 are angled together at the mid-point of the trailer body. The load is uncovered when the arm units 58 and 60 are angled away from each other toward opposite ends of the trailer body 70

Hydraulic cylinders 72 and 74 can be provided on both sides of the trailer body 70 as shown to move the arm units 58 and 60 back and forth. Alternatively, an hydraulic cylinder can be provided under the trailer body and coupled to a shaft linking a pair of pivot arms (not shown). Hydraulic power can be provided from the "wet system" of the trailer body or from an electro-hydraulic power pack.

Many other modifications of the presently disclosed invention will become apparent to those skilled in the art having benefitted from the instant disclosure.

What is claimed is:

1. A cover mechanism for a trailer having an opening defined by the perimeter of said trailer, said opening having a first end and a second end, and a first side and a second side, comprising:

a first flexible cover;

a first device securable to said first flexible cover and said trailer, said first device adapted to cover and uncover a first portion of said opening with said first flexible cover, wherein said first portion extends from said first side to said second side and from said first end to a first point between said first end and said second end;

a second flexible cover; and a second device securable to said second flexible cover and said trailer, said second device adapted to cover and uncover a second portion of said trailer with said second cover, wherein said second portion extends from said first side to said second side and from said first point to said second end.

2. A cover mechanism for a trailer having a first end and a second end, and a first side and a second side, comprising:

a first assembly, including
a first flexible cover having a first end and a second end, and
a first pivot arm unit pivotally engagable with said trailer and secured to said first end of said first flexible cover, said first pivot arm unit adapted to cover and uncover a first portion of said trailer with said first flexible cover, wherein said first portion extends from said first side of said trailer to said second side of said trailer and from said first end of said trailer to a first point between said first end and said second end of said trailer; and a second assembly, including
a second flexible cover having a first end and a second end, and
a second pivot arm unit securable to said trailer between said first assembly and said second end of said trailer, said second assembly secured to said first end of said second flexible cover, said second pivot arm unit adapted to cover and uncover a second portion of said trailer with said second flexible cover, wherein said second portion extends from said first side of said trailer to said second side of said trailer and from said first point to said second end of said trailer.

3. The cover mechanism of claim 2, further comprising:
a first roller proximate said first end of said trailer and secured to said second end of said first flexible cover; and
a second roller proximate said second end of said trailer and secured to said second end of said second flexible cover.

4. The cover mechanism of claim 3, further comprising an idler roller positionable proximate said first end of said trailer.

5. A cover mechanism for a trailer having a first end and a second end, comprising:

a first assembly, including
a first flexible cover having a first end and a second end, and
a first pivot arm unit pivotally engagable with said trailer and secured to said first end of said first flexible cover, said first pivot arm unit adapted to cover and uncover a first portion of said trailer with said first flexible cover;

a second assembly, including
a second flexible cover having a first end and a second end, and
a second pivot arm unit securable to said trailer between said first assembly and said second end of said trailer, said second assembly secured to said first end of said second flexible cover, said second pivot arm unit adapted to cover and uncover a second portion of said trailer with said second flexible cover;

a first roller proximate said first end of said trailer and secured to said second end of said first flexible cover;

a second roller proximate said second end of said trailer and secured to said second end of said second flexible cover; and a locking mechanism securable to said trailer and to at least one of said first and second pivot arm units to inhibit movement thereof with respect to said trailer.

6. The cover mechanism of claim 5, wherein said locking mechanism includes a rachet mechanism securable to said trailer and a strap engagable by said rachet mechanism and securable to one of said first and second pivot arm units.

7. The cover mechanism of claim 3, wherein each said first and second pivot arm unit includes a first arm substantially parallel and spaced apart from a second arm.

8. A cover mechanism for a trailer having a first end and a second end, comprising:

a first assembly, including
a first flexible cover having a first end and a second end, and
a first pivot arm unit pivotally engagable with said trailer and secured to said first end of said first flexible cover, said first pivot arm unit adapted to cover and uncover a first portion of said trailer with said first flexible cover;

a second assembly, including
a second flexible cover having a first end and a second end, and
a second pivot arm unit securable to said trailer between said first assembly and said second end of said trailer, said second assembly secured to said first end of said second flexible cover, said second pivot arm unit adapted to cover and uncover a second portion of said trailer with said second flexible cover;

a first roller proximate said first end of said trailer and secured to said second end of said first flexible cover; and a second roller proximate said second end of said trailer and secured to said second end of said second flexible cover, wherein each said first and second pivot arm unit includes a first arm substantially parallel and spaced apart from a second arm, and wherein said first and second arms of said first pivot arm unit are spaced farther apart than said first and second arms of said second pivot arm unit.

9. The cover mechanism of claim 8, wherein each said first and second arm of said first and second pivot arm unit includes an end portion that extends above said trailer and which is connected to an end portion of a respective said first and second arm by a connecting element.

10. A cover mechanism for a trailer having a first end and a second end, comprising:

a first assembly, including
a first flexible cover having a first end and a second end, and
a first pivot arm unit pivotally engagable with said trailer and secured to said first end of said first flexible cover, said first pivot arm unit adapted to cover and uncover a first portion of said trailer with said first flexible cover;

a second assembly, including
a second flexible cover having a first end and a second end, and
a second pivot arm unit securable to said trailer between said first assembly and said second end of said trailer, said second assembly secured to said first end of said second flexible cover, said second pivot arm unit adapted to cover and uncover a second portion of said trailer with said second flexible cover;

a first roller proximate said first end of said trailer and secured to said second end of said first flexible cover; and a second roller proximate said second end of said trailer and secured to said second end of said second flexible cover, wherein each said first and second pivot arm unit includes a first arm substantially parallel and spaced apart from a second arm, and wherein said first and second arms of said first pivot arm unit include an end portion that is angled with respect to another portion of each said arm.

11. The cover mechanism of claim 7, further including a spring loaded roller disposed between end portions of said first and second arms of said first pivot arm unit.

12. A cover mechanism for a trailer having a first end and a second end, comprising:

a first assembly, including
  a first flexible cover having a first end and a second end,
  a first pivot arm unit having a first arm substantially parallel and spaced apart from a second arm, said first and second arms having a first end pivotally engaged with said trailer and a second end that extends above said trailer,
  a first connecting element secured to said first end of said first flexible cover and connecting said second end of said first arm to said second end of said second arm, and
  a first roller proximate said first end of said trailer and secured to said second end of said first flexible cover; and a second assembly, including
  a second flexible cover having a first end and a second end,
  a second pivot arm unit having a first arm substantially parallel and spaced apart from a second arm, said first and second arms having a first end pivotally engaged with said trailer between said first assembly and said second end of said trailer, and a second end that extends above said trailer,
  a first connecting element secured to said first end of said second flexible cover and connecting said second end of said first arm to said second end of said second arm, and
  a second roller proximate said second end of said trailer and secured to said second end of said second flexible cover, wherein said first and second arms of said first pivot arm unit include an end portion that is angled with respect to another portion of each said arm.

* * * * *